April 20, 1937. C. A. BREWER 2,078,173
CLUTCH CONTROL SYSTEM
Original Filed Oct. 2, 1929 2 Sheets-Sheet 1

INVENTOR.
CHARLES A. BREWER
BY H. Q. Clayton
ATTORNEY

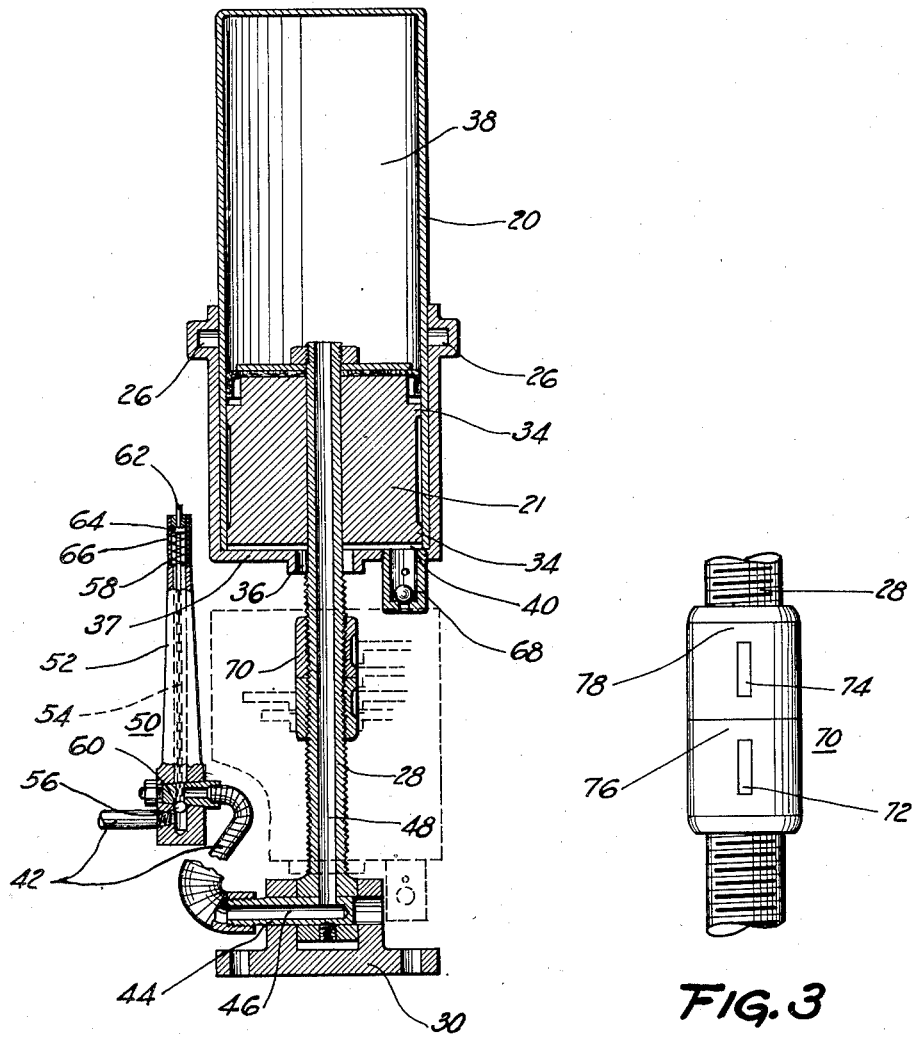

Patented Apr. 20, 1937

2,078,173

UNITED STATES PATENT OFFICE 2,078,173

CLUTCH CONTROL SYSTEM

Charles A. Brewer, Noroton Heights, Conn., assignor of one-half to Philip J. Kury, Arverne, N. Y.

Original application October 2, 1929, Serial No. 396,691. Divided and this application April 3, 1933, Serial No. 664,254

19 Claims. (Cl. 192—91)

This invention relates to motor vehicles, and more particularly to a safety control system for controlling the operation of a motor vehicle to reduce a large number of accidents, provide safety operation and a more uniform and easier control of the vehicle than is now possible with the ordinary constructions.

It is a particular object of the invention to provide an improved operating and control means for a clutch, to reduce wear on the vehicle and the various operating mechanisms thereof, and also to tend to smooth out the operation and control of the vehicle to reduce starting strains and fatigue to the passengers.

The present invention relates to one embodiment of such a power operated clutch operating mechanism wherein the power means in effecting an engagement of the clutch accurately simulates a corresponding foot operation of the clutch; by this is meant an operation wherein the clutch pedal is permitted, under the action of the clutch spring, to move relatively rapidly during the first stage of its engaging movement and until the clutch plates are about to contact, the rate of movement being then appreciably decreased as the plates are moved into driving engagement, these phases of movement being followed by other varying rates of movement to effectively complete the engagement of the clutch. In short, there is provided automatically operable means for effecting a variable movement of the clutch pedal as it moves during its clutch engaging stroke.

The invention further contemplates the provision of a double-ended clutch operating actuator so constructed that the rate of engaging movement of the clutch is a function of the position of the power element of the actuator with respect to the fixed element thereof, the two elements being constructed to so control the gaseous pressure within one end of the actuator as to effect the aforementioned variable engaging movement of the clutch. Preferably the actuator comprises two relatively movable members forming opposite chambers between them and the control of the clutch engagement is effected by regulation and variation of the escape of air from one of said chambers.

Other objects of the invention and desirable details of construction will become apparent from the following detailed description of a preferred embodiment of the invention taken in conjunction with the accompanying drawings, in which:

Figure 2 is a longitudinal section through the clutch operating actuator consitituting the essence of the instant invention, the section being taken on line 2—2 of Figure 1; and Figure 3 discloses in detail that portion of the stem secured to the piston of the actuator, said stem constituting a part of the valve means for controlling the clutch engaging operation of the actuator.

Figure 1:
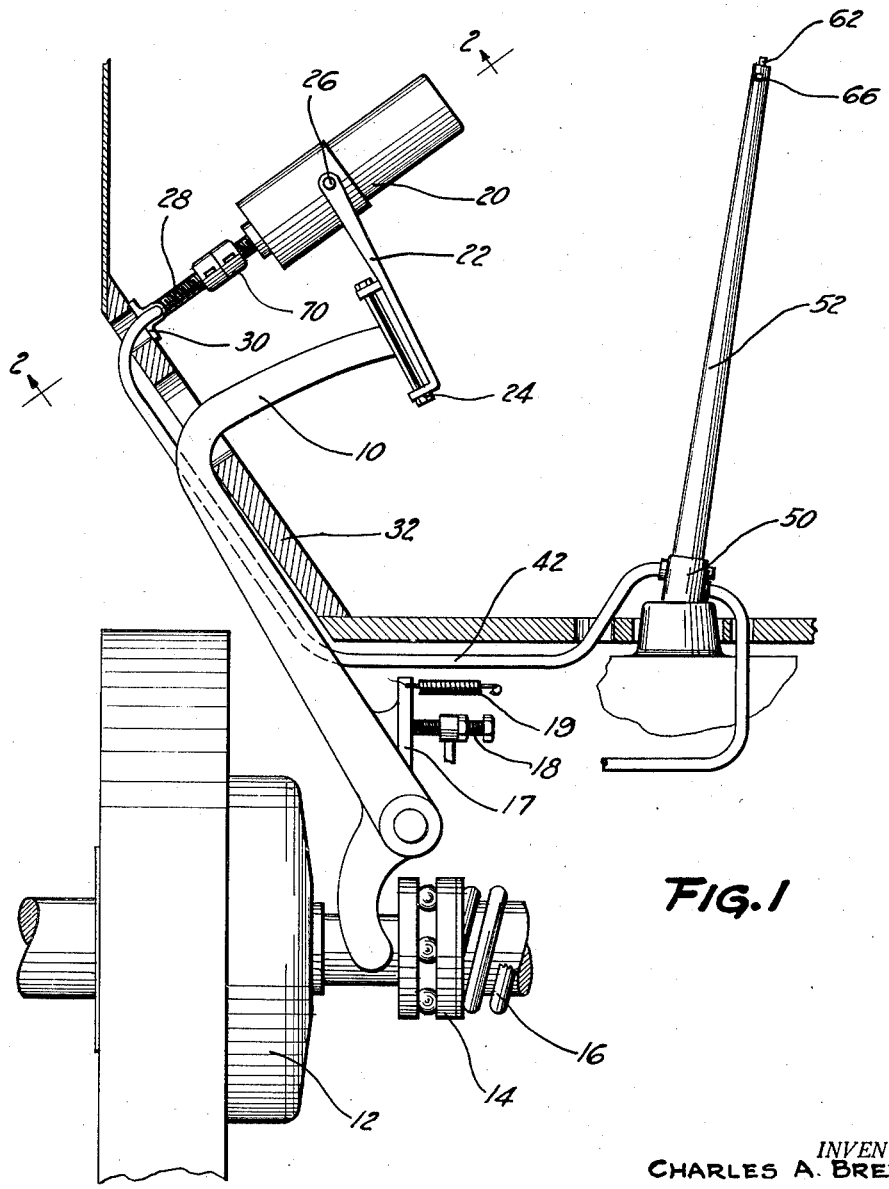
Figure 1 is a partial side elevation of a system, embodying the present invention, constituting an automatic power control for the conventional clutch of an automotive vehicle.

Referring to Figure 1 disclosing the major elements of the mechanism constituting the present invention, there is provided a clutch pedal 10 operatively connected to a conventional clutch mechanism 12 by a thrust collar 14, the latter engaged by the usual clutch spring 16. The clutch pedal may also be provided with a stop lug 17 to cooperate with an adjustable stop screw 18 to limit upward movement of the pedal under the action of a spring 19. This construction provides the necessary clearance at the clutch thrust bearing, relieving undue wear on this bearing.

The power means for operating the clutch pedal comprises relatively movable cylinder and piston elements 20 and 21, together constituting a clutch operating actuator, the cylinder being connected with the clutch pedal by a bracket arm 22 secured to the pedal by bolts 24 and to trunnions 26 on the cylinder. The piston element of the actuator is preferably stationary with respect to the movable cylinder member, a stem 28 secured to the piston being pivotally connected to a bracket 30 secured to the floorboard 32. Such a pivotal connection insures an angular movement of the actuator unit to compensate for the arcuate movement of the clutch pedal. The piston 21 is in the nature of a block member and is provided with ribs 34, which maintain it properly centered so that the stem 28 is properly centered in an opening 36 in a lower end wall 37 of the cylinder.

The actuator is rendered operable to control the operation of the clutch by regulating the gaseous pressure within its two end compartments 38 and 40. The intake manifold vacuum of the internal-combustion engine of the motor provides a convenient and effective source of power for operating the actuator, the manifold and actuator being interconnected by a flexible conduit 42. The conduit is connected to a bearing member 44 journalled in bracket 30, said member having a bore 46 communicating with a bore 48 in the stem 28 providing a fluid transmitting connection between the conduit and the upper compartment 38 of the actuator.

This upper compartment is alternately placed in communication with the manifold and with the atmosphere to initiate the clutch disengaging and engaging operations of the actuator respectively by means of a manually operable three-way valve 50 preferably incorporated in the body of the gear shift lever 52 of the change-speed transmission. The valve 50 comprises a chain 54 provided with a ball 56 at one end thereof adapted to be seated, under the action of a return spring 58, upon a seat 60 to close off communication between the sections of the conduit 42 connected to the shift lever. The plunger at its other end is provided with a stem 62 adapted to be pressed downwardly by the thumb of the driver to position an enlargement or block portion 64 beneath an atmospheric vent 66 to thus cut off communication between the atmosphere and actuator and establish communication between the manifold and actuator to effect a disengagement of the clutch.

As is well known in this art, the pumping action of the engine pistons at closed throttle creates a subatmospheric pressure within the intake manifold measured by some twenty inches of mercury, and this evacuated condition of the manifold is made use of to energize automotive accessories such as the actuator of the instant invention, windshield wiper pump, etc.

Thus when it is desired to disengage the clutch by power, for example, prior to a gear shifting operation, all that is necessary with the suggested mechanism is to depress the stem 62 whereupon the compartment 38 of the actuator is placed in communication with the manifold, partially evacuating the same and resulting in the movement of the cylinder and its attached clutch pedal under the load of the atmosphere acting on the exterior surface of the cylinder. Release of the stem 62, under the action of the spring 58, reconnects the compartment 38 with the atmosphere, permitting the clutch spring 16 to reengage the clutch. A check valve 68 functions to insure the aforementioned declutching action by allowing the influx of air to the lower compartment 40 as the cylinder moves downwardly.

The invention is particularly directed, however, to means for controlling the mode of movement of the clutch pedal as the clutch is being engaged. To this end the actuator is provided with the aforementioned opening 36 in its lower end wall 37, said opening adapted to receive a two-part hub member or control block 70 threaded upon the stem 28.

The outside diameter of the block member is such as to provide a relatively close fit within the opening 36, and said member is further provided with spaced slots 72 and 74, as disclosed in detail in Figure 3. The orificed end wall 37 of the actuator taken with the block member 70 together constitute valve means, collateral to the three-way valve 50, for determining the mode of efflux of air from the lower compartment 40 of the actuator as the clutch is being engaged under the action of its spring. Thus as the cylinder moves upwardly from the clutch released dotted line position of Figure 2 the air within the compartment 40 is forced out relatively rapidly until the opening 36 is closed by the end of the block 70. The clutch pedal thus moves relatively rapidly during the first portion of its throw, decreasing the total elapsed time necessary to engaging the clutch. This is of particular advantage in operating the vehicle in traffic. The block 70 is so positioned with respect to the opening 36 that the aforementioned rapid movement is terminated just as the clutch plates are about to engage. It is then desired that the engaging movement be appreciably slowed up, particularly in starting the vehicle, in order that the engine torque be increased to a degree to pick up the load of the vehicle. The close fit of the block within the opening insures this slow movement of the clutch pedal, inasmuch as only a relatively small amount of air is permitted to leak past the block. After the clutch has been slipped during the aforementioned second stage of engaging movement, it is desirable to effect a relatively rapid third stage of engaging movement. This is insured by virtue of the increased air leak from the compartment 40 via the lower slot 72. The block is further provided with full bodied portions 76 and 78 and the aforementioned slot 74 to provide for successive slow and fast engaging movements of the driving clutch plate.

It is the purpose of the invention, however, to so proportion and construct the block 70 as to effect the desired engaging movement of the clutch to suit the needs of the particular vehicle upon which the power device is installed, for it is obvious that the engaging movement of the clutch may be varied at will by the construction and arrangement of the opening 36 and block 70, which together constitute a valve to control the clutch engaging operation of the actuator.

There is thus provided a very effective power operated device for operating the clutch of an automotive vehicle, the disengaging and engaging operations being effected with a minimum of effort and in a manner accurately simulating a conventional manual operation of the clutch.

While one illustrative embodiment has been described, it is not my intention to limit the scope of the invention to that particular embodiment, or otherwise than by the terms of the appended claims.

This case is a division of my co-pending application Serial No. 396,691 filed October 2, 1929 for "Safety control system for motor vehicles".

Having thus described my invention what is claimed is:

1. In a clutch control device for motor vehicles including a spring tending to cause engagement of the clutch, means for controlling operation of the clutch comprising relatively movable members forming opposite chambers between them, one of said chambers being adapted for pressures approximately atmospheric and below, and the other of said chambers being adapted for pressures approximately atmospheric and above, means for lowering the pressure in said low pressure chamber and automatically admitting pressure to said high pressure chamber to effect disengagement of said clutch and reversely supplying pressure to said low pressure chamber and allowing exhaust from said high pressure chamber to permit engagement of said clutch, said clutch operating means automatically controlling the movement of the clutch and comprising exhaust outlet means passing air under pressure above atmospheric, and means for varying the resistance of said outlet means according to the position of the clutch.

2. In a clutch control device for motor vehicles including a spring tending to cause engagement of the clutch, means for controlling operation of the clutch comprising relatively movable members forming opposite chambers between them, one of said chambers being adapted for pressures approximately atmospheric and below, and the other of said chambers being adapted for pressures approximately atmospheric and above, means controlled by the operator for lowering the pressure in said low pressure chamber and automatically admitting pressure to said high pressure chamber to effect disengagement of said clutch, and reversely supplying pressure to said low pressure chamber and allowing exhaust from said high pressure chamber to permit engagement of said clutch, said clutch operating means automatically controlling the movement of the clutch and comprising exhaust outlet means passing air under pressure above atmospheric, and means for varying the resistance of said outlet means according to the position of the clutch.

3. In a clutch control device for motor vehicles including a spring tending to cause engagement of the clutch, means for controlling operation of the clutch comprising relatively movable members forming opposite chambers between them, one of said chambers being adapted for pressures approximately atmospheric and below, and the other of said chambers being adapted for pressures approximately atmospheric and above, means controlled by the operator for lowering the pressure in said low pressure chamber and automatically admitting pressure to said high pressure chamber to effect disengagement of said clutch and reversely supplying pressure to said low pressure chamber and allowing exhaust from said high pressure chamber to permit engagement of said clutch, said clutch operating means automatically controlling the movement of the clutch and comprising exhaust outlet means formed between relatively moving parts of said members acting to pass air under pressure above atmospheric under varying resistance according to the position of the clutch.

4. The combination with the clutch of an automotive vehicle, of power means for controlling the operation of said clutch, said means comprising a double-ended pressure differential operated motor comprising relatively movable piston and cylinder elements, said elements comprising parts constructed to provide valve means for controlling the clutch engaging operation of said motor, said parts including a slotted stem member forming a part of the aforementioned piston element and further including an orificed end plate of said cylinder element, together with other valve means for controlling the aforementioned motor to initiate the clutch disengaging and engaging operations of the motor.

5. In a clutch operating mechanism for an automotive vehicle, a double-ended vacuum operated motor comprising relatively movable cylinder and piston elements, said piston element provided with a stem member, said stem comprising means cooperating with a portion of said cylinder, for determining the rate of efflux of power fluid from said motor during one phase of the clutch engaging operation of the motor.

6. In a clutch operating mechanism for an automotive vehicle, a double-ended vacuum operated motor comprising relatively movable cylinder and piston elements, said piston element provided with a stem member, said stem comprising a slot cooperating with a portion of said cylinder for determining the rate of efflux of power fluid from said motor during one phase of the clutch engaging operation of the motor, together with means for initiating the clutch disengaging and engaging operations of the motor.

7. In a clutch control mechanism for an automotive vehicle, a double-ended motor comprising a cylinder element and a piston element, said piston comprising a stem extending through an orificed end of the cylinder, valve means for initiating the clutch disengaging and engaging operations of the motor, and other valve means comprising the aforementioned orificed portion of the cylinder end wall and a slotted portion of the aforementioned stem.

8. In a clutch control mechanism for an automotive vehicle, a double-ended motor comprising a cylinder element and a piston element, said piston comprising a stem extending through an orificed end of the cylinder, a manually operable three-way valve means for initiating the clutch disengaging and engaging operations of the motor, and other valve means, independent of said three-way valve means, for controlling the rate of engagement of the clutch, said means comprising the aforementioned orificed portion of the cylinder end wall and a slotted portion in the aforementioned stem.

9. In a clutch controlling mechanism for the clutch of an automotive vehicle, a motor comprising a cylinder element having a closed end and an orificed end, a piston element within said cylinder, a stem member secured to said piston and extending through the orifice in the aforementioned cylinder end, a slot in said stem adapted, in one relative position of the cylinder and stem, to register with the orifice in the cylinder end wall to thereby permit a relatively rapid efflux of air from the motor as the clutch is being engaged.

10. The combination with the clutch of an automotive vehicle, of a clutch operating motor comprising a cylinder element having a closed end and an orificed end, means interconnecting the cylinder and clutch, a relatively stationary piston element within said cylinder, a stem member secured to said piston and extending through the orifice in the aforementioned cylinder end, a slot in said stem adapted, in one relative position of the cylinder and stem, to register with the orifice in the cylinder end wall to thereby permit a relatively rapid efflux of air from the motor as the clutch is being engaged.

11. In a gaseous pressure differential operated power clutch control device for motor vehicles, a double-ended power actuator including cooperable elements, one of which is movable relative to the other, means for connecting one of said elements to a clutch to be operated, means for controlling the gaseous pressure within one end of said actuator to initiate the disengaging and engaging operations of said element connected to the clutch, and other means for controlling the gaseous pressure within the other end of said actuator for controlling the latter to effect an irregular engaging movement of the clutch.

12. In automobile clutch control mechanism, the combination with a clutch control member, of a pneumatically operated power unit comprising a plurality of relatively movable elements including a cylinder and piston, means operatively connecting one of said elements with said clutch control member, and means governing the discharge of air from one end of said cylinder for decelerating the motion of said piston relative to said cylinder at one point in its stroke to secure a gradual engagement of the clutch.

13. Clutch control mechanism including in combination, a plurality of relatively movable elements including a cylinder and a piston in said cylinder, operating connections between one of said elements and a clutch of a motor vehicle, means for connecting one end of said cylinder to a source of lower than atmospheric pressure, the other end of said cylinder having connection to the atmosphere, and means for restricting the size of said atmospheric connection during a portion only of the relative movement of said piston and cylinder during movement of the clutch in clutch engaging direction.

14. In an automotive vehicle provided with a clutch comprising driving and driven members and including in combination therewith a double-ended pressure differential operated motor operably connected to the driven clutch member by a movable element of the motor, valve means for controlling the degree of gaseous pressure within one end of the motor to initiate the clutch disengaging and engaging operations of the motor, and means for so controlling the degree of gaseous pressure within the other end of the motor as to provide for a variable movement of the driven clutch member toward engaged position, said movement being retarded as the clutch members are being engaged.

15. In a vacuum power device for operating a motor vehicle clutch, a cylinder member, a piston member adapted for movement relative to the cylinder, means for operatively connecting one of said members to the clutch, means for controlling the gaseous pressure within one end of the cylinder to initiate the disengaging and engaging operations of the clutch, and means for controlling the gaseous pressure within the other end of the cylinder to control the movement of the piston member to effect a rapid movement of the piston member toward engaged position followed by a retarded movement at the time of engagement of the clutch surfaces.

16. In an automotive vehicle provided with a clutch, the combination therewith of a double-ended pressure differential operated motor, said motor having a movable member and being divided into two compartments, means for operatively connecting said movable member to the clutch, means for controlling the gaseous pressure within one of said compartments to initiate the disengaging and engaging operations of the clutch, and means for controlling the gaseous pressure within the other of said compartments to control the movement of the movable member to effect a rapid movement of said movable member toward clutch engaged position followed by a retarded movement at the time of engagement of the clutch surfaces.

17. In a clutch control device for motor vehicles, a double-ended fluid pressure operated power device connected to the clutch and capable of releasing it, means for connecting one end of said device to a source of sub-atmospheric pressure, means for controlling said connection, and means rendered operative by movement of the clutch to control engagement of the clutch by controlling the pressure in the other end of said device.

18. In a clutch control device for motor vehicles, a power device connected to the clutch and capable of releasing it, a control device for the power device to cause it to function to release the clutch, and means adapted to control the efflux of fluid from said power device for varying the resistance of the latter to the engaging movement of the clutch during said movement.

19. In a clutch control device for motor vehicles, a suction power device connected with the clutch and capable of releasing it, a control device for the power device to cause it to function to release the clutch, and means adapted to control the efflux of fluid from said power device for varying the resistance of the latter to the engaging movement of the clutch.

CHARLES A. BREWER.